(12) United States Patent
McCall

(10) Patent No.: US 8,960,705 B2
(45) Date of Patent: Feb. 24, 2015

(54) SLIDING HITCH WITH AUTOMATIC ARMING LATCH

(71) Applicant: B & W Custom Truck Beds, Inc., Humboldt, KS (US)

(72) Inventor: Travis M. McCall, Humboldt, KS (US)

(73) Assignee: B & W Custom Truck Beds, Inc., Humboldt, KS (US)

( * ) Notice: Subject to any disclaimer, the term of this patent is extended or adjusted under 35 U.S.C. 154(b) by 0 days.

(21) Appl. No.: 14/062,557

(22) Filed: Oct. 24, 2013

(65) Prior Publication Data

US 2014/0117645 A1  May 1, 2014

Related U.S. Application Data

(60) Provisional application No. 61/719,095, filed on Oct. 26, 2012.

(51) Int. Cl.
*B62D 53/08* (2006.01)
*B60D 1/01* (2006.01)

(52) U.S. Cl.
CPC .................................. *B60D 1/01* (2013.01)
USPC ...................................................... 280/438.1

(58) Field of Classification Search
CPC .......................... B62D 53/0807; B62D 53/08
USPC ............................... 280/438.1, 433
See application file for complete search history.

(56) References Cited

U.S. PATENT DOCUMENTS

| | | | |
|---|---|---|---|
| 2,807,477 A | 9/1957 | Tuso, Jr. | |
| 2,958,542 A * | 11/1960 | Janeway | 280/438.1 |
| 5,356,167 A | 10/1994 | Hall et al. | |
| 5,449,191 A | 9/1995 | Cattau | |
| 5,529,329 A | 6/1996 | McCoy | |
| 5,707,070 A | 1/1998 | Lindenman et al. | |
| 5,772,229 A | 6/1998 | Cattau | |
| 5,839,745 A | 11/1998 | Cattau et al. | |
| 5,915,713 A | 6/1999 | Kniep | |
| 6,065,766 A | 5/2000 | Pulliam | |
| 6,247,720 B1 * | 6/2001 | Linger et al. | 280/441 |
| 6,308,977 B1 * | 10/2001 | Pulliam et al. | 280/441 |
| 6,357,777 B1 | 3/2002 | Linger et al. | |
| 6,386,570 B2 | 5/2002 | Linger et al. | |
| 6,557,883 B2 | 5/2003 | Linger et al. | |
| 6,682,089 B2 * | 1/2004 | McCoy et al. | 280/438.1 |
| 6,685,210 B2 | 2/2004 | Lindenman et al. | |
| 6,846,000 B2 * | 1/2005 | Grinde et al. | 280/439 |
| 6,935,650 B2 | 8/2005 | Grinde et al. | |

(Continued)

*Primary Examiner* — Joseph M Rocca
*Assistant Examiner* — Gabriela C Craciun
(74) *Attorney, Agent, or Firm* — Erickson, Kernell, Derusseau & Kleypas, LLC

(57) ABSTRACT

A sliding hitch with a self-arming latch is described. The hitch includes a carriage slideably mounted on a base. The base includes a latching pin on a pivot arm that is biased to extend toward engagement with the carriage and a rotatable shaft with an arming member and a locking member. Rotation of the shaft to an unlocked orientation, cams the pivot plate away from the carriage to withdraw the pin and enable sliding of the carriage on the base. An arm of the arming member is also rotated into the path of a protuberance associated with the carriage. Contact between the protuberance and the arm during sliding of the carriage along the base causes rotation of the shaft to a locked orientation enabling extension of the pin toward engagement with the carriage and engaging the locking member with the pivot plate to restrict withdrawal of the pin.

13 Claims, 15 Drawing Sheets

(56) References Cited

U.S. PATENT DOCUMENTS

| | | |
|---|---|---|
| 6,969,090 B1 * | 11/2005 | Works ............................ 280/407 |
| 7,584,982 B2 * | 9/2009 | Fisher ......................... 280/438.1 |
| 7,717,451 B2 | 5/2010 | Algüera |
| 7,726,678 B1 * | 6/2010 | Connell et al. ................. 280/441 |
| 7,753,391 B1 | 7/2010 | Hesse et al. |
| 7,806,423 B2 * | 10/2010 | Vikstrom et al. ........... 280/405.1 |
| 7,806,424 B2 * | 10/2010 | Burns et al. .................... 280/433 |
| 7,871,096 B2 * | 1/2011 | Colibert-Clarke et al. 280/438.1 |
| 7,938,429 B2 | 5/2011 | Mann et al. |
| 7,988,176 B2 | 8/2011 | Colibert et al. |
| 7,988,177 B2 * | 8/2011 | Colibert et al. ............. 280/441.1 |
| 2002/0175494 A1 * | 11/2002 | Laarman .................... 280/438.1 |
| 2002/0175495 A1 | 11/2002 | Laarman |
| 2003/0160429 A1 * | 8/2003 | McCoy et al. ................. 280/433 |
| 2006/0108770 A1 * | 5/2006 | Burns et al. ................... 280/433 |
| 2007/0007747 A1 * | 1/2007 | Laarman .................... 280/438.1 |
| 2007/0290481 A1 * | 12/2007 | Fisher ........................ 280/438.1 |
| 2008/0029995 A1 * | 2/2008 | Alguera ..................... 280/407.1 |
| 2009/0072515 A1 | 3/2009 | Alguera et al. |
| 2011/0109061 A1 * | 5/2011 | Peterson et al. ........... 280/438.1 |
| 2012/0007336 A1 | 1/2012 | Sibley, Jr. et al. |

* cited by examiner

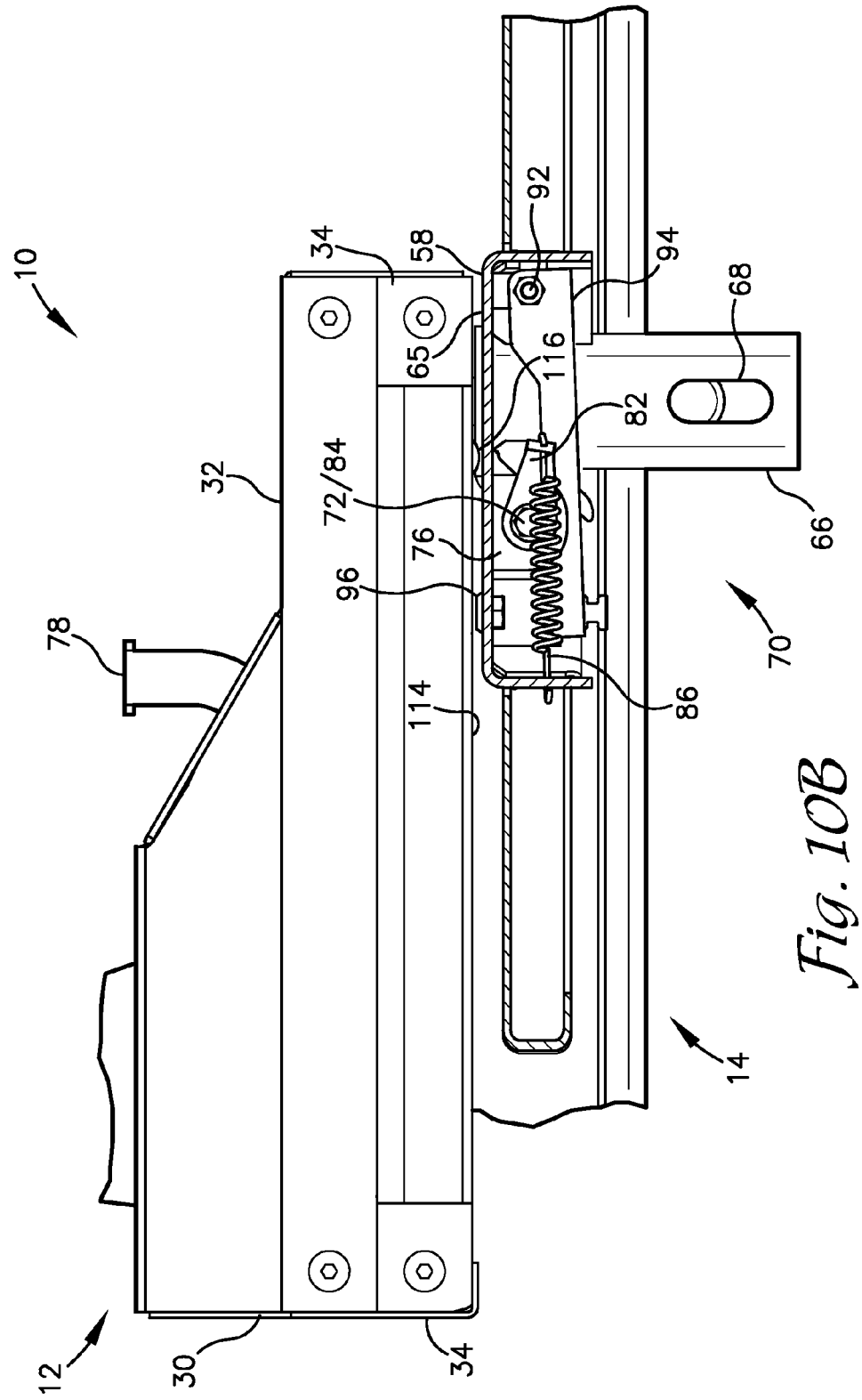

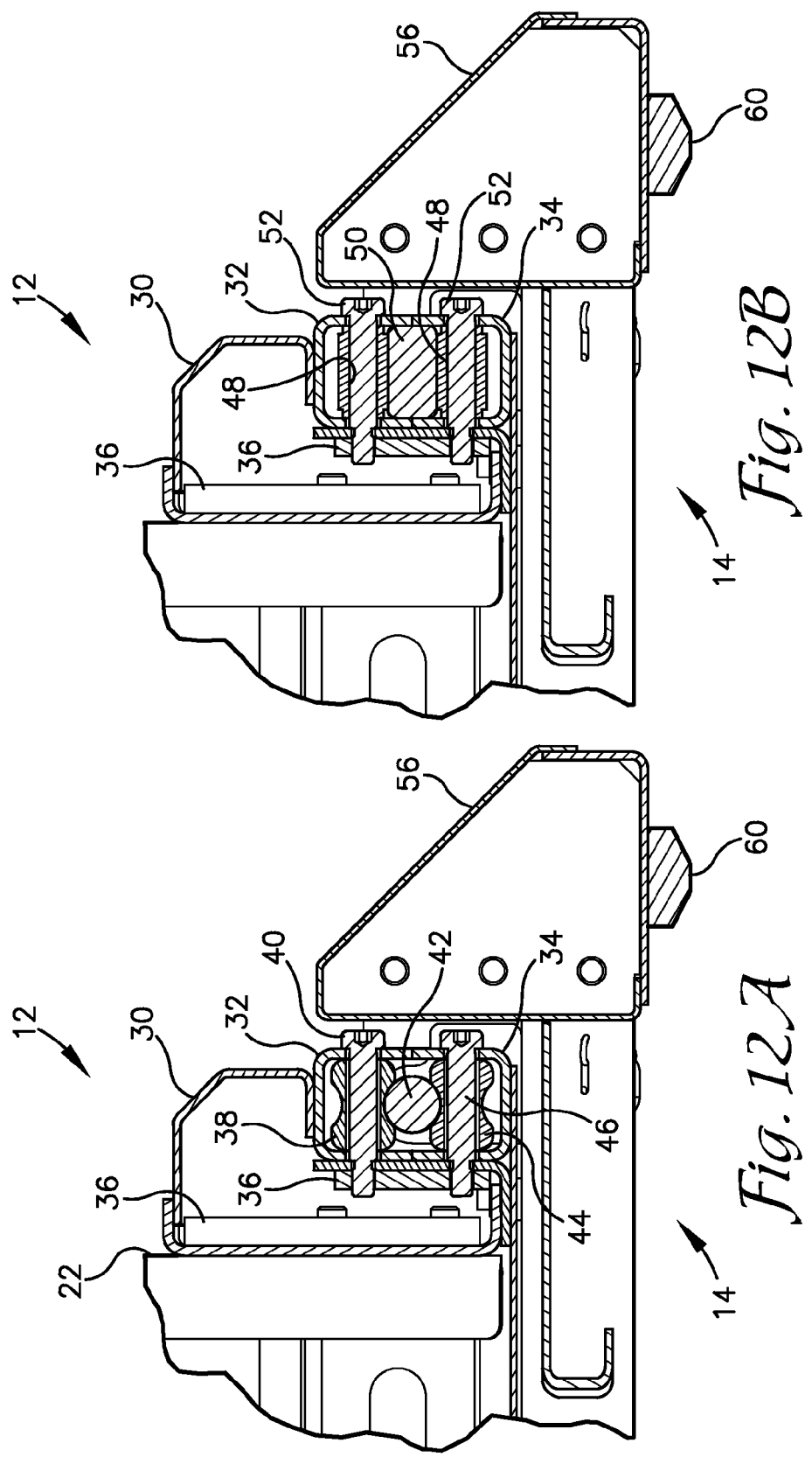

SLIDING HITCH WITH AUTOMATIC ARMING LATCH

CROSS-REFERENCE TO RELATED APPLICATIONS

This application claims the benefit of U.S. provisional patent application Ser. No. 61/719,095, filed Oct. 26, 2012, under 35 U.S.C. §119(e).

BACKGROUND

A fifth-wheel hitch is a common apparatus for coupling a trailer to a truck for towing. The fifth-wheel hitch is preferably positioned over or spaced forward of the rear axle of the truck. In trucks with short-beds, due to the shorter distance between the rear axle and the back of the cab, positioning the fifth-wheel hitch over or in front of the rear axle significantly limits the turning radius of the trailer without damaging the cab. To provide additional clearance between the cab and the trailer, a variety of moveable fifth-wheel hitch assemblies have been developed which permit sliding of the hitch rearward behind the rear axle in situations in which tight turns between the truck and the trailer are likely to be required.

For example, U.S. Pat. No. 7,871,096 to Colibert-Clarke et al. describes a displaceable fifth-wheel hitch assembly that includes a platform mounted in the bed of a truck with a pair of tracks mounted along each side thereof. A hitch assembly is slideably mounted between the tracks and includes a spring-biased locking pin that extends from the hitch assembly into holes aligned along the center of the platform. The locking pin is biased toward engagement with the platform by a spring disposed between a clip attached to the pin and a support member of the hitch assembly. A rod extends through a slotted flange extending from the platform and is coupled to the locking pin. The slotted flange acts as a fulcrum about which the rod can be pivoted to raise the locking pin and to allow the hitch assembly to move along the platform track. The rod can be engaged with a hook to maintain the locking pin in the raised position. Movement of the hitch assembly on the platform track can disengage the rod from the hook to allow the locking pin to engage the holes in the platform track and lock the hitch assembly in place.

U.S. Patent Publication No. 2011/0109061 to Peterson et al. describes a sliding hitch assembly mounted on a pair of elevated rails. A locking mechanism is provided that employs a cable actuated cam member and a pair of locking pins. One of the locking pins is associated with a forward position of the hitch assembly and the other is associated with a rearward position. A handle coupled to the cable is pivoted between a forward engagement position and a rearward engagement position to slide the cam member between a sidewall of the rails and a portion of the locking pins. The cam member thereby draws one locking pin out of engagement with the hitch assembly and allows the second locking pin to extend from the rail for engagement with the hitch assembly in the second position.

There remains a need in the art for a self-arming latching mechanism for a sliding-hitch assembly that is easily operable by a user. There is also a need for an automatic-arming latching mechanism with a locking feature that prevents disengagement of the latching mechanism. Some solutions employ spring biased members, but no mechanical engagement is provided to further prevent such disengagement. Additionally, a self-arming latching mechanism that is simple and compact for incorporation substantially within a base or hitch carriage would improve on prior designs.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief this disclosure describes, among other things, a sliding fifth-wheel hitch with a self-arming latching assembly.

The fifth-wheel hitch includes a base assembly that is coupleable to a vehicle. The base assembly includes a pair of longitudinally extending legs disposed along opposite edges thereof and a cross-member disposed therebetween. The legs each include a rod or a sliding surface on which a hitch carriage is slideably mounted.

A latching assembly is disposed within the base assembly substantially within the cross-member. The latching assembly includes a shaft extending along the length of the cross-member and rotatable about its length. A handle is fixedly coupled to an end of the shaft to enable a user to rotate the shaft. A flange or lever arm extends radially outward from the shaft and is coupled at a distal end thereof to a spring. The spring is further affixed to the base assembly such that an over center condition is created in which the shaft is rotated by the spring in either a first direction toward a locked orientation or in a second direction toward an unlocked orientation.

A latch release and arming member extends from the shaft in a plane perpendicular to the length of the shaft. The latch release and arming member comprises a cam presenting a cam surface that contacts a plate to pivot the plate about a coupling with the base assembly and between the locked and unlocked orientations. A latching pin is coupled to the plate and is extended into engagement with the hitch carriage when the shaft is rotated to the locked orientation in which the cam is oriented to allow the pivot plate to pivot upward. The latch pin is withdrawn from such engagement when the shaft is rotated to the unlocked orientation in which the cam is rotated to pivot the pivot plate downward.

A trigger arm projects radially outward from the cam on the latch release and arming member. When the shaft is rotated to the unlocked orientation, the trigger arm extends upward through the base assembly and into the path of a portion of the hitch carriage such as a protuberance or boss. Subsequent engagement of the distal end of the trigger arm by the boss, pivots the trigger arm downward, rotating the latch release and arming member into an armed orientation with the lever arm on the shaft pivoted below the center position and biasingly urged toward a locked orientation.

A locking member comprising a finger is also formed on the latch release and arming member or is separately mounted on the shaft. The finger engages the plate to prevent pivoting of the plate when the shaft is rotated to the locked orientation.

The hitch carriage can thus be moved from a forward position to a rearward position, and vice-versa, along the base assembly by actuating the handle to rotate the shaft from the locked orientation to the unlocked orientation. The locking member is disengaged from the plate and the latching pin is withdrawn from engagement with the hitch carriage. During movement of the hitch carriage along the base assembly, the arming member is contacted by the protuberance to automatically rotate the shaft toward the locked orientation. Upon alignment of the latching pin with a receiver in the hitch carriage, the latching pin engages the receiver and the finger of the locking member engages the plate to lock the latching pin in place.

DESCRIPTION OF THE DRAWINGS

Illustrative embodiments of the invention are described in detail below with reference to the attached drawing figures, and wherein:

FIG. 10B is a cross-sectional elevational view similar to FIGS. 8B and 9B depicting the latching assembly in an armed orientation;

FIG. 12A is a partial cross-sectional view of the sliding fifth-wheel hitch assembly taken along the line 12A-12A shown in FIG. 2 depicting guide rollers on the hitch carriage for coupling to the base assembly; and FIG. 12B is a partial cross-sectional view of another embodiment of the sliding fifth-wheel hitch assembly shown in FIG. 12A depicting glide blocks on the hitch carriage for slideably coupling to the base assembly.

DETAILED DESCRIPTION

Figure 1:
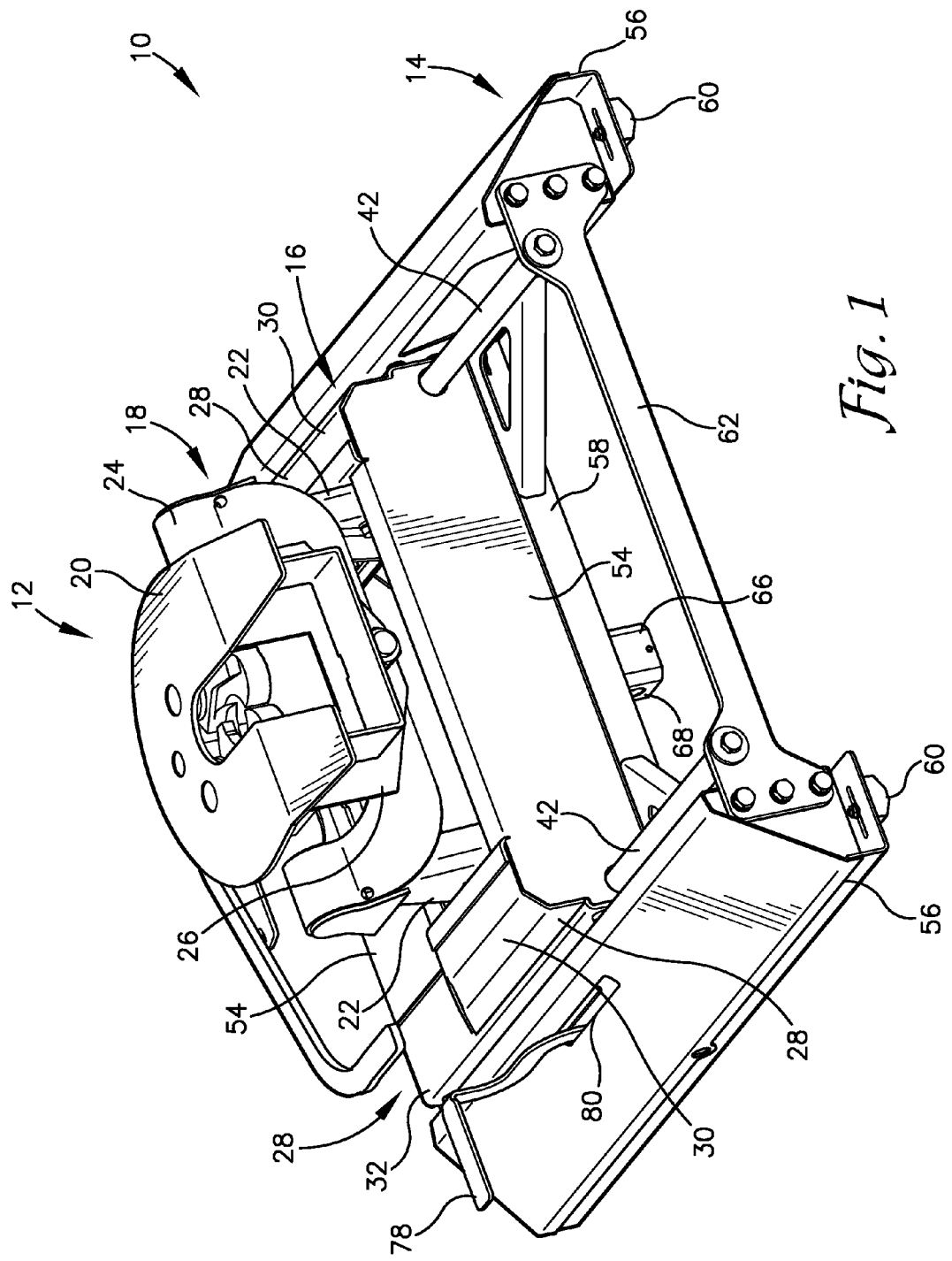
FIG. 1 is a perspective view of a sliding fifth-wheel hitch assembly depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

With reference to FIGS. 1-12, a sliding-hitch assembly 10 is described in accordance with an embodiment of the invention. The description herein is provided with respect to a standard orientation of the sliding-hitch assembly 10 disposed in a vehicle. As such, terms such as forward, rearward, front, rear, variations thereof, and terms of similar import are used with respect to common understandings of forward and rearward travel of a vehicle. The terms longitudinal and transverse indicate orientation along the length of the vehicle and along the width of the vehicle, respectively.

The sliding-hitch assembly 10 is configured for installation in the bed of a vehicle, such as a pick-up truck, but the assembly 10 can be configured for installation on tractors or in other heavy-duty or light-duty applications without departing from the scope of embodiments described herein. The sliding-hitch assembly 10 comprises a hitch assembly 12 that is slideably coupled to a base assembly 14. The hitch assembly 12 includes a hitch carriage 16 on which a hitch support 18 and a fifth-wheel hitch 20 are mounted.

The fifth-wheel hitch 20 is of a type useable to receive and maintain a pivotal coupling with a kingpin of a trailer. A wide variety of such hitches are known in the art including for purposes of illustration only the hitch shown in U.S. Pat. No. 6,170,850 to Joseph Works. The fifth-wheel hitch 20 can also be configured to provide a ball-hitch, draw bar, or other trailer-coupling apparatus without departing from the scope described herein.

The hitch support 18 supports the fifth-wheel hitch 20 above and couples it to the hitch carriage 16. The hitch support 18 includes a pair of legs 22 extending upwardly from opposite sides of the hitch carriage 16. A generally rectangular plate with a center section removed is formed or folded about its transverse dimension to form a cross-member or saddle 24 with a U-shaped profile. The saddle 24 is disposed on and between distal ends of the legs 22 and is pivotally coupled thereto. The saddle 24 is thus pivotable about an axis extending between the legs and transverse to the sliding-hitch assembly 10. A base 26 of the fifth-wheel hitch 20 is coupled centrally along the width of the saddle 24. The coupling enables the base 26 and fifth-wheel hitch 20 to pivot side-to-side about a longitudinal axis extending through the coupling. As such, the fifth-wheel hitch 20 can pivot transversely and longitudinally during coupling of the hitch 20 with a trailer and/or during towing of the trailer.

The hitch carriage 16 includes a pair of longitudinally extending support arms or side support assemblies 28 that slideably couple the hitch assembly 12 to the base assembly 14. As best seen in FIG. 12A, the side support assemblies 28 comprise a main support member 30, an upper roller support member 32, and a pair of lower roller support members 34.

The main support member 30 comprises an elongate tubular member with a generally inverted L-shaped, cross-sectional profile. As depicted in FIG. 12A, the main support member 30 is manufactured from a plurality of formed plate sections that are welded or otherwise coupled together, but the main support member 30 might be otherwise formed from one or more component pieces such as by extrusion or molding without departing from the scope of embodiments of the invention. The leg 22 of the hitch support 18 is coupled along a vertical portion of the main support by one or more fasteners, welding, or the like. The main support member 30 may also include one or more reinforcing members 36 disposed therein to provide additional support for coupling with the legs 22 and/or the upper and lower roller support members 32, 34 as described below.

The upper roller support member 32 comprises an elongate channel that is oriented with an open face thereof directed downward. The upper roller support member 32 is disposed beneath a horizontal portion of the main support member 30 and against a side of the vertical portion opposite that of the leg 22. The upper roller support member 32 extends a distance longitudinally and parallel to the main support member 30.

A roller 38, wheel, glide, bearing, or similar component is disposed within the open channel of the upper roller support member 32 adjacent each end thereof. A rod or axle 40 is disposed through sidewalls of the upper roller support member 32 and through the center of the roller 38 to rotatably couple the roller 38 within the channel of the upper roller support member 32. The axle 40 may extend into the main support member 30 to couple the upper roller support member to the main support member 30. The roller 38 is configured to roll along a guide bar 42 of the base assembly 14 (or slide or glide in the case of a bearing or glide) as discussed more fully below, and may include a profile that compliments the shape of the guide bar 42.

The pair of lower roller support members 34, only one of which is shown, comprise sections of channel with dimensions similar to that of the upper roller support member 32 but of shorter longitudinal length. The lower roller support members 34 are oriented with an open face thereof directed upward toward the open face of the upper roller support member 32 such that opposing edges of the upper and lower roller support members 32, 34 are abutted and may be coupled together, such as by welding or with mechanical fasteners. The lower roller support members 34 are placed at opposite ends of the upper roller support member 32 such that the pair of lower roller support members 34 are longitudinally spaced apart. Like the upper roller support member 32, a roller 44 is disposed within the lower roller support member 34 and is rotatably coupled thereto by a rod or axle 46 extending through the sidewalls thereof. The axle 46 may couple the lower roller support member 34 to the main support member 30. The rollers 38 and 44 may be the same or different, e.g. having the same or different profiles, materials, or the like.

As depicted in FIG. 12B, the hitch carriage 16 can also be configured with glide blocks 48 that slide along a guide bar 50 instead of or in addition to the rollers 38, 44. A glide block 48 can be disposed within one or both of the upper and lower roller support members 32, 34 and fastened to the upper and lower roller support members 32, 34 by one or more fasteners 52. The glide blocks 48 comprise one or more pads or bearing blocks comprised of a low-friction material, such as nylon, Teflon®, polyethylene, or the like, that enable sliding of the hitch carriage 16 along the guide bars 50. In an embodiment, a combination of rollers 38, 44 and glide blocks 48 might be employed, e.g. a roller 38 might be disposed within the upper roller support member 32 while a glide block 48 is disposed in the lower roller support member 34, without departing from the scope of embodiments of the invention described herein. In addition, although the glide blocks 48 are shown as rectangular and sliding along a rectangular guide bar 50 it is understood that the glide blocks could be configured with a geometry that mates with the guide bar or rails 42.

The hitch carriage 16 may include one or more enclosure plates 54 that extend between the support arms 28. The enclosure plates 54 act as cross-member supports for the support arms 28 and at least partially enclose the hitch carriage for aesthetic reasons and/or to provide some protection from environmental elements, such as precipitation, dirt and debris.

With continued reference to FIGS. 1-6, the base assembly 14 comprises a pair of longitudinally extending elongate base members 56 and a cross-member 58 extending therebetween. The longitudinal base members 56 each include a foot 60 adjustably mounted on an underside thereof and extending along the length thereof. The foot 60 may be configured for receipt in recess or corrugation found on the floor of a bed of a vehicle and is adjustable side-to-side or transversely for adaptation to variations in spacing between such recesses in a variety of vehicles. The foot 60 is formed of a rubber, plastic, or similar material to aid in reducing damage or wear between the longitudinal base members 56 and the bed of the vehicle.

Mounting brackets 62 are coupled to ends of the base members 56 for supporting the guide rails 42. The guide rails 42 are disposed parallel to the longitudinal base members 56 and spaced inwardly from the respective base member 56. As discussed previously, the guide rails 42 are configured to support the rollers 38 or can be configured as guide bars 50 for supporting glide blocks 48.

Figure 5:
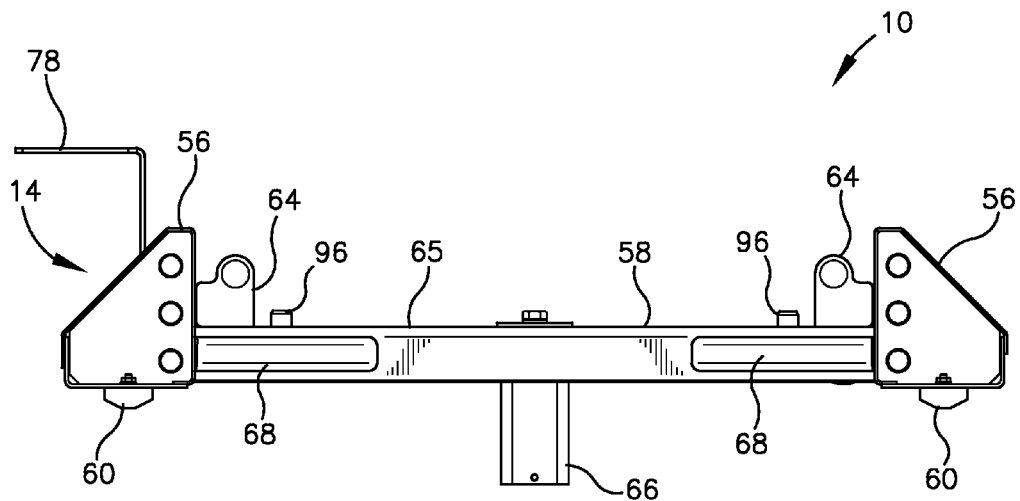
FIG. 5 is front elevational view of a base of the sliding fifth-wheel hitch assembly depicted with a hitch carriage removed.

The cross-member 58 extends between the longitudinal base members 56 and generally medially therewith. The cross-member 58 comprises a channel or C-shaped member oriented with an open face of the channel directed downwardly. As depicted in FIG. 5, a pair of guide rail support plates 64 are disposed on a top portion 65 and at opposite ends of the cross-member 58 for receiving and supporting the guide rails 42 generally medially relative to the ends which are supported by mounting brackets 62.

A coupling member or coupler 66 is affixed to the center of the cross-member 58 and extends vertically downward from the bottom thereof. The coupling member 66 is configured for receipt within a mating receiver mounted in the bed of a vehicle. A preferred coupler 66 has a square or non-circular cross-section for mating with a receiver having a complimentary cross-section. The mating geometry between the coupler 66 and receiver preventing rotation of the hitch assembly 10 relative to the truck bed.

The coupling member 66 and the receiver include one or more transversely oriented through holes 68 that are aligned to receive a pin and thereby fixedly couple the member 66 to the receiver. The mating receiver is typically mounted beneath and/or extending through a floor of the bed and is attached to the frame of the vehicle. As such, the sliding-hitch assembly 10 can be installed in the bed of the vehicle via a single connection point. The assembly 10 is further supported by the feet 60 contacting the floor of the bed. The sliding-hitch assembly 10 is also configurable for coupling to a vehicle in a variety of other ways, e.g. the assembly 10 might be configured for bolting or welding directly to the frame of a vehicle with or without a bed, among other methods, without departing from the scope of embodiments of the invention described herein.

Figure 2:
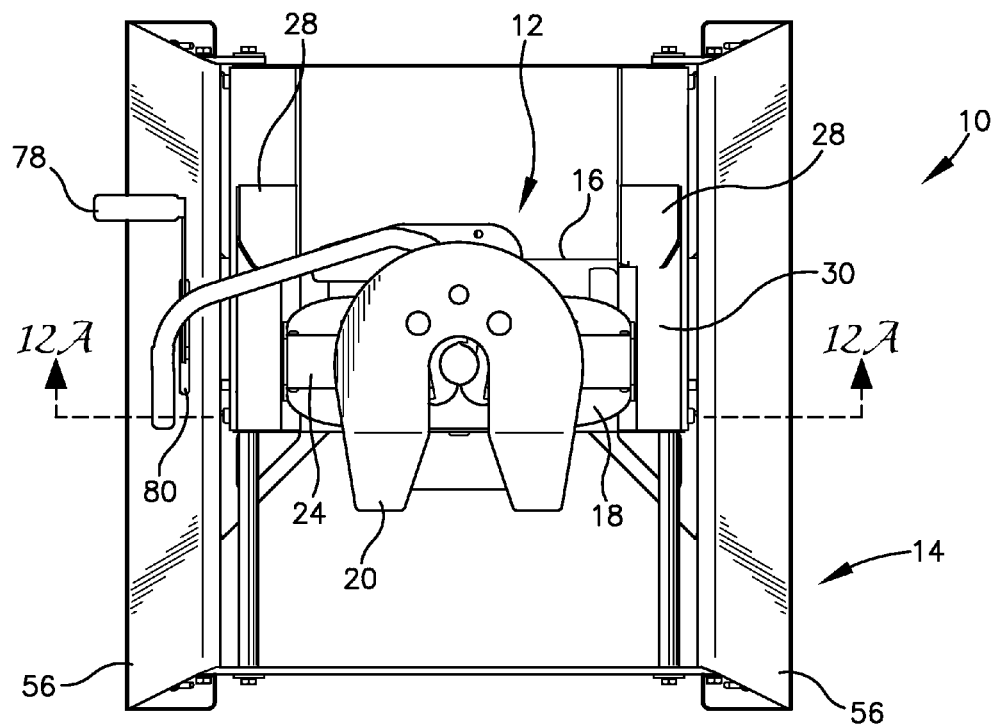
FIG. 2 is a top plan view of the sliding fifth-wheel hitch assembly.
Figure 3:
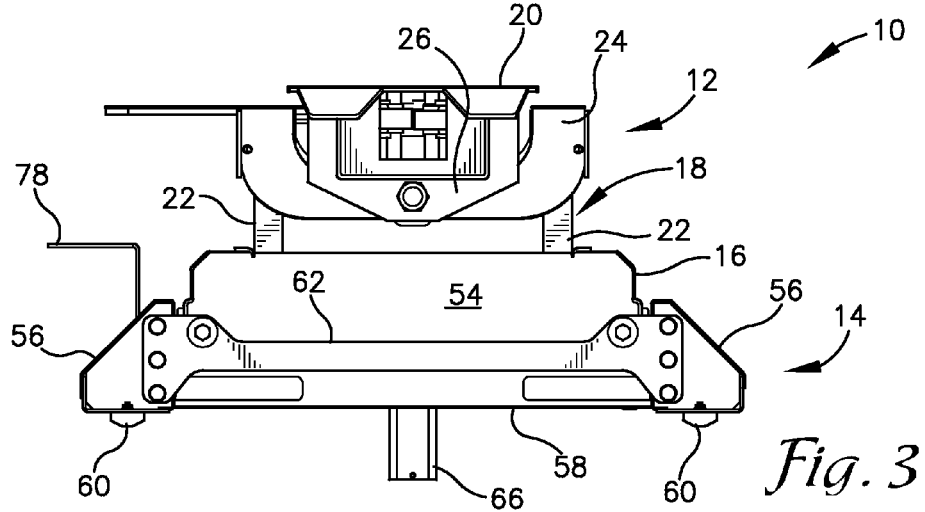
FIG. 3 is a front elevational view of the sliding fifth-wheel hitch assembly.
Figure 4:
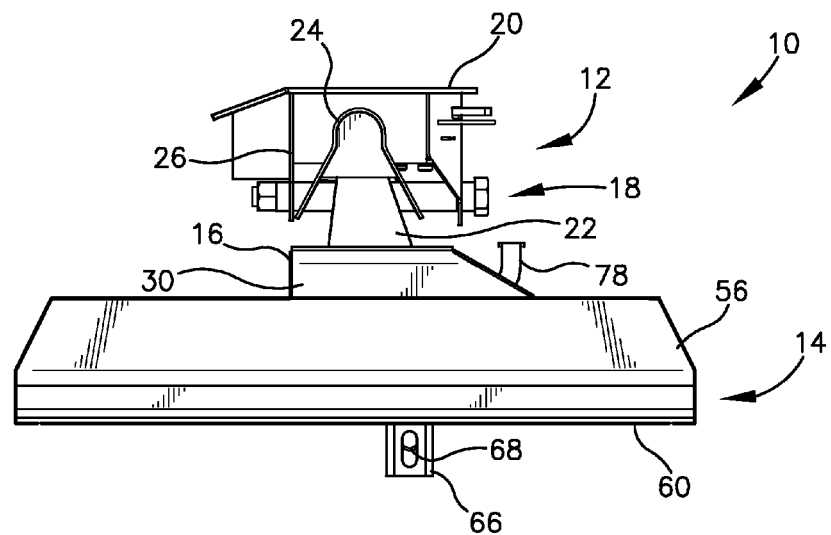
FIG. 4 is a side elevational view of the sliding fifth-wheel hitch assembly.
Figure 6:
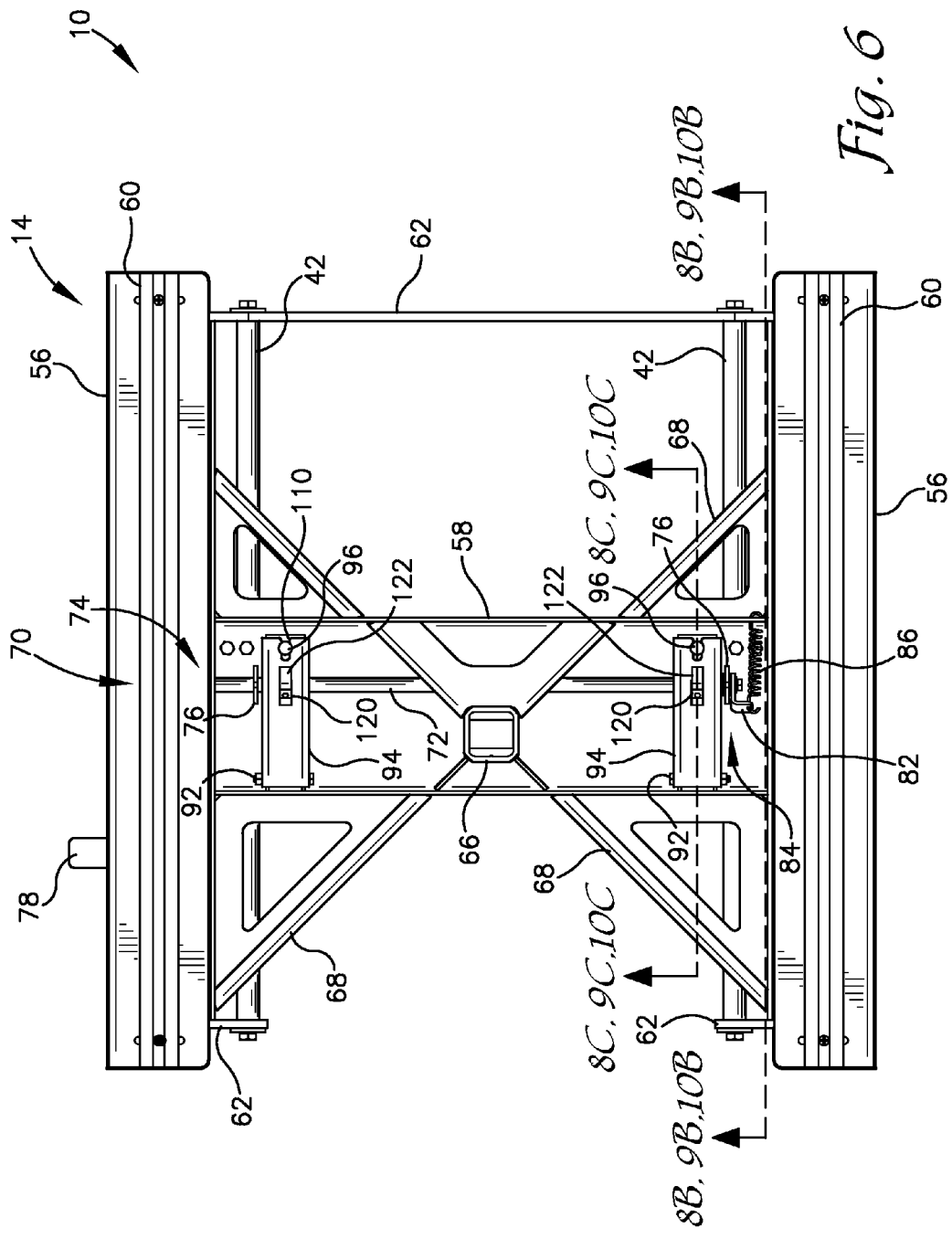
FIG. 6 is a bottom plan view of the base of the sliding fifth-wheel hitch assembly.
Figure 7:
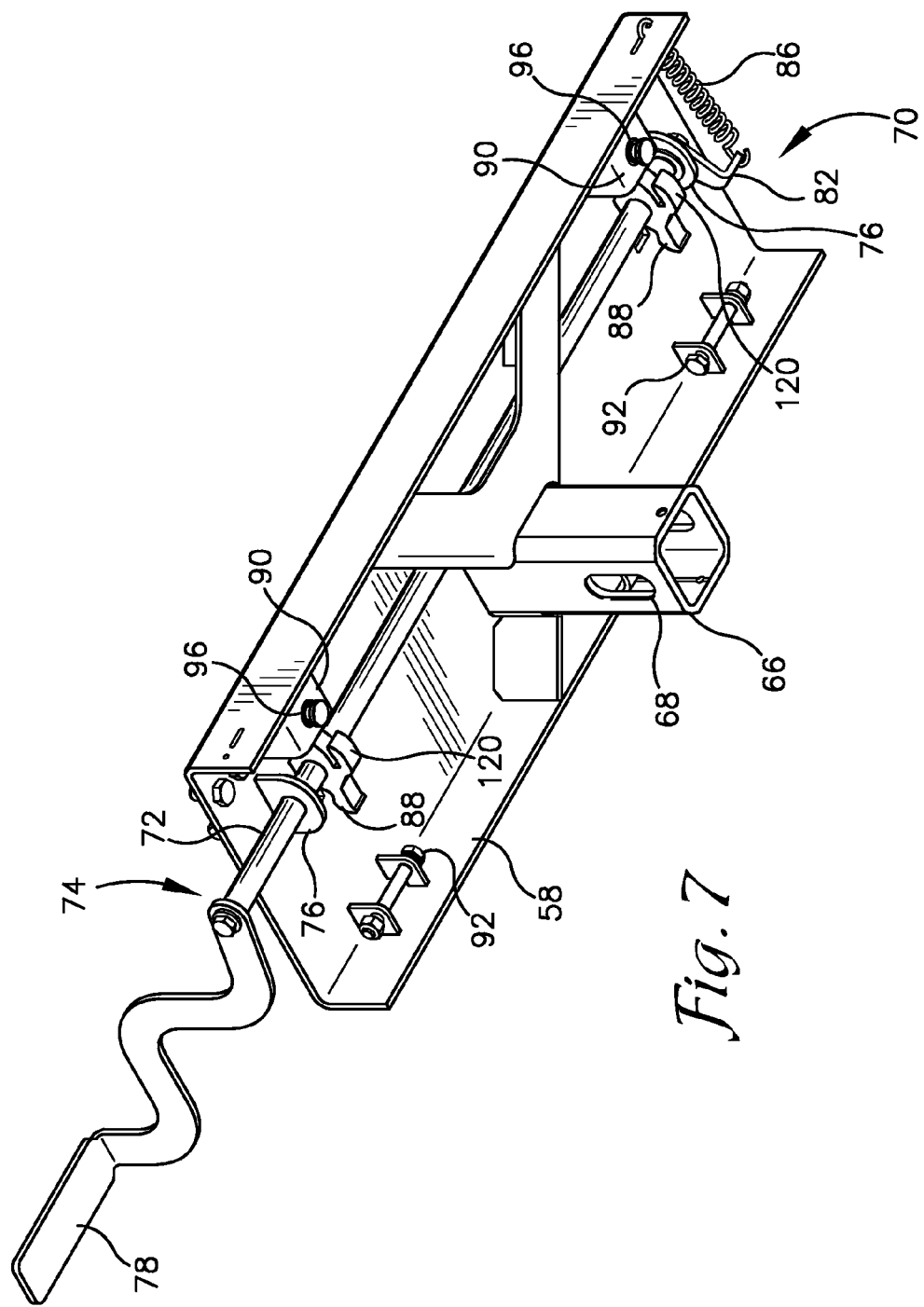
FIG. 7 is perspective bottom view of a central portion of the base of the sliding fifth-wheel hitch assembly depicted with pivot arms and a central brace removed.

With additional reference to FIGS. 6 and 7, a latching assembly 70 is disposed on an underside of the cross-member 58. The latching assembly 70 comprises a shaft 72 extending along the length of the cross-member 58 with a first end 74 of the shaft 72 extending from an end of the cross-member 58 and into a respective one of the longitudinal base members 56. A pair of support brackets or tabs 76 extends from the underside of the cross-member 58 near opposite ends thereof to rotatably support the shaft 72. A handle 78 is fixedly coupled to the first end 74 of the shaft 72 and extends upwardly out of the base 56 through an elongate slot 80 in a top surface thereof as best seen in FIGS. 1 and 2.

Figure 8A:
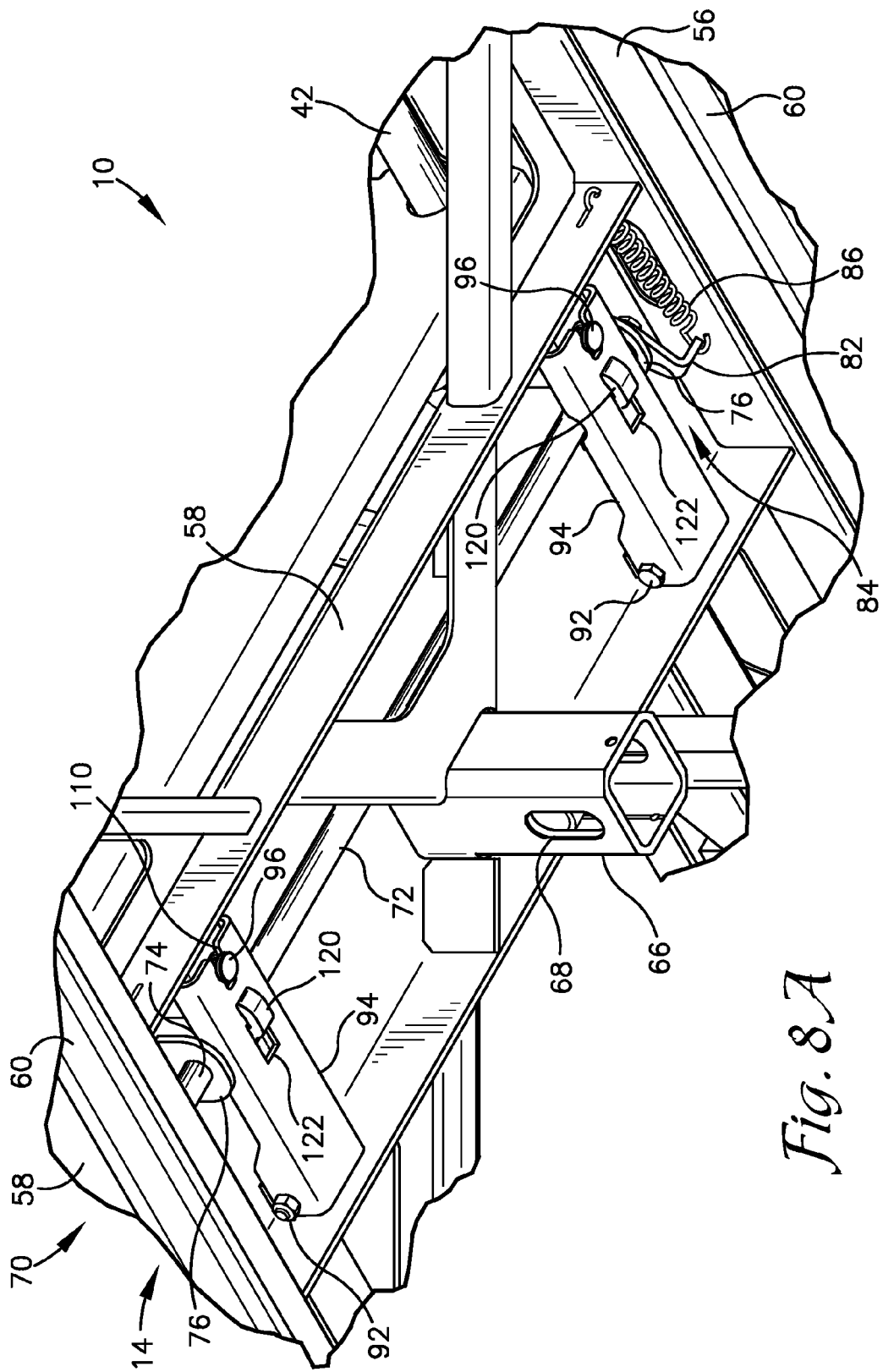
FIG. 8A is a bottom perspective view of the sliding fifth-wheel hitch assembly depicting a latching assembly in a locked orientation in accordance with an embodiment of the invention.
Figure 8B:
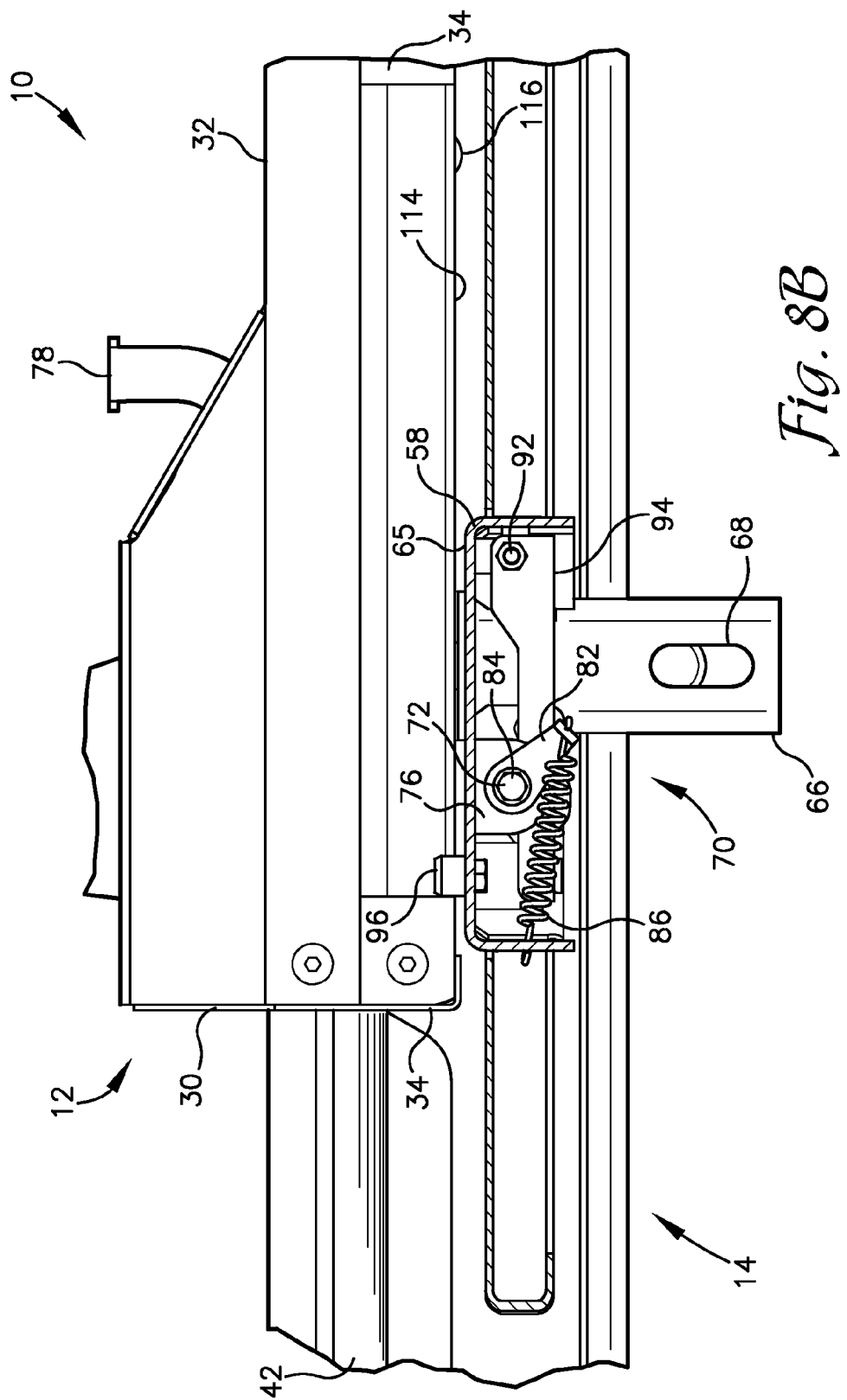
FIG. 8B is a cross-sectional elevational view taken along the line 8B-8B shown in FIG. 6 depicting the latching assembly in the locked orientation.

A flange or lever arm 82 extends radially outward from a second end 84 of the shaft 72. A tension spring 86 is coupled between a distal end of the lever arm 82 and a sidewall of the cross-member 58. As best seen in FIGS. 8B and 9B, the coupling of the spring 86 and the lever arm 82 is configured to provide an over-center condition in which the spring 86 biases rotation of the shaft 72, via the lever arm 82, in a first direction or in a second direction depending on which side of a center position the lever arm 82 lies; the center position comprising the position in which the spring 86 extends across second end 84 of the shaft 72 and is aligned with an imaginary line representing the lever arm formed between the axis of rotation of the shaft 72 and the distal end of the lever arm 82.

A pair of latch release and arming members 88 is disposed about the shaft 72 near each end of the cross-member 58. The latch release and arming members 88 are each longitudinally aligned with a latch pin support plate 90 and a hinge 92, as depicted in FIG. 7, which are positioned generally vertically below each of the side support assemblies 28 of the hitch carriage 16. A pivoting plate 94 is pivotally coupled to the hinge 92 at a first end and retains a latch pin 96 in a second end thereof, as shown in FIGS. 6, and 8-11.

The latch pin 96 extends upward from the second end of the pivoting plate 94 and slideably passes through a hole in the latch pin support plate 90 and a hole in the top portion 65 of the cross-member 58. The latch pin 96 comprises a generally cylindrical pin that includes an upper section 98 having a first diameter and an intermediate section 100 having a second diameter smaller than the first. The larger first diameter of the upper section 98 forms a shoulder 102 or annular flange. A coil spring 104 is disposed around the intermediate section of the latch pin 96 between the shoulder 102 and the latch pin support plate 90 and biases the latch pin 96 to extend through the top portion 65 of the cross-member 58. A washer 106 or similar component having an central aperture larger than the second diameter of the latch pin 96 but smaller than the first diameter can be disposed between the shoulder 102 and the spring 104 to provide a larger contact surface for the spring 104. Or the shoulder 102 might include a flange or tabs extending radially outward beyond the first diameter to provide the larger contact surface for the spring 104.

The latch pin 96 shown includes an annular recess 108 adjacent a lower end and configured for receipt in a slot 110 (See FIG. 9A) in the pivoting plate 94 for coupling thereto. The coupling between the latch pin 96 and the pivoting plate 94 restricts vertical movement between the latch pin 96 and the pivot plate 94 such that their upward and downward movements are maintained in unison. The coupling also allows the latch pin 96 to slide and/or pivot with respect to the coupling so that the latch pin 96 can move linearly while second end of the pivoting plate 94 to which the latch pin 96 is coupled is pivoted along an arc. The sliding and/or pivoting of the latch pin 96 about the coupling with the pivoting plate 94 avoids binding between the components as the latching assembly 70 is actuated.

Figure 8C:
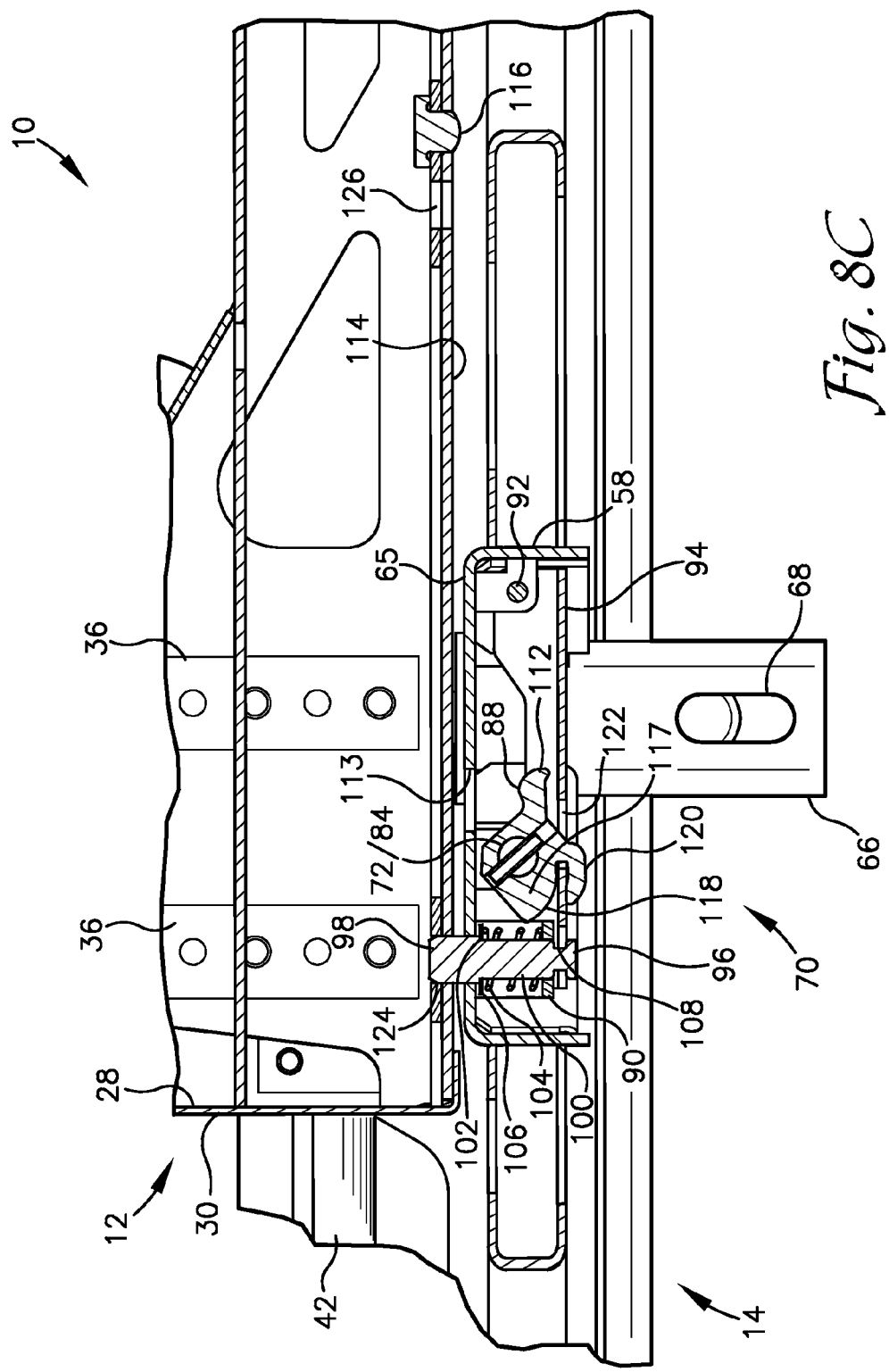
FIG. 8C is a cross-sectional elevational view taken along the line 8C-8C shown in FIG. 6 depicting the latching assembly in the locked orientation.

Each of the latch release and arming members 88 is formed as a cam 117 with a cam surface 118 extending radially outward from the shaft 72 with an increasing radius along an arc of approximately sixty degrees. The cam surface 118 contacts the respective pivoting plate 94 to pivot the plate 94 downward about the hinge 92 when the shaft 72 and the latch release and arming members 88 are rotated using handle 78 from a locked or latched position as depicted in FIG. 8C to an unlocked or unlatched position as depicted in FIG. 9C.

In the latched position, the narrowest portion of each cam 117 extends between the latching assembly shaft 72 and the respective pivoting plates 94 which allows latch pins 96 to be biased upward through the openings in the top portion 65 of the cross member 58 and into one of at least two aligned receivers 124 and 126 formed in a bottom surface 114 of a respective side support assembly 28, including for example, in the bottom surface 114 of a respective main support member 30. The receivers 124 and 126 on the respective side support assemblies 28 comprises first and second aligned pairs of receivers 124 and 126 for retaining the carriage in a forward position (in solid lines in FIG. 11) and a rearward position (in phantom lines in FIG. 11) respectively. As best seen in FIGS. 8B and 8C, when the latch release and arming members are in the latched position, the lever arm 82 extends below the center position and the tension spring 86 draws the lever arm 82 downward and toward the rear of the cross member 58 (clockwise in FIG. 8B) thereby biasingly resisting rotation of the latch release and arming members 88 out of the latched alignment.

In an unlatched position, the widest portion of each cam 117 is rotated to extend between the shaft 72 and the respective pivoting plates 94, pivoting the plates 94 downward such that the latch pins 96 are withdrawn from receivers 124 or 126 against the biasing force of springs 104. As best seen in FIGS. 9B and 9C, when the latch release and arming members 88 are in the unlatched position, the lever arms 82 extend above the center position and the tension spring 86 draws lever arm 82 upward and toward the rear of the cross member 58 (counterclockwise in FIG. 9B) thereby biasingly resisting rotation of the latch release and arming members 88 out of the unlatched alignment.

Each of the latch release and arming members 88 includes an arm 112 that extends generally radially outwardly from the cam 117. The arm 112 is of sufficient length to at least partially extend through an aperture 113 in the top portion 65 of the cross-member 58 when latch release and arming member 88 is rotated to the unlocked orientation depicted in FIG. 9C. In the unlocked orientation, a distal end of the arm 112 is spaced apart from and below a bottom surface 114 of the main support member 30 of the hitch carriage 16 or may contact and/or slide along the bottom surface 114. The distal end of the arm 112 is configured to be contacted and displaced downward by a boss 116, protuberance, flange, nub, rib, or other portion or feature of the carriage 16 extending downwardly from the bottom surface 114 of the main support member 30, as described more fully below. Arm 112 is displaced downward by boss 116 far enough to rotate the lever arm 82 below the center position such that tension spring 86 now pulls or urges the latch release and arming member 88 toward the latched position. Until the carriage 16 is slid far enough to bring one of the pairs of receivers 124 or 126 back into alignment with the latch pins 96, abutment of the latch pins 96 against the bottom surface 114 of the main support member prevents the latching assembly 70 from advancing from the unlatched orientation to the latched orientation and this orientation of the latching assembly 70 may be referred to as an armed orientation.

A locking member 120 extends from each of the arming members 88 between the arm 112 and the cam surface 118.

The locking member 120 comprises a generally L-shaped finger that extends radially outward from the shaft a first distance before turning to extend a second distance in a direction away from the arm 112 and spaced radially outward from the cam surface 118. The locking member 120 is configured to protrude through an aperture 122 in the pivoting plate 94 to capture a portion of the pivoting plate 94 between the locking member 120 and the cam surface 118 when in the locked orientation and to be substantially withdrawn from the aperture 122 when in the unlocked orientation. It is foreseen that the locking member 120 may be formed as a separate component mounted on the shaft 72 adjacent to the latch release and arming member 88.

Figure 11:
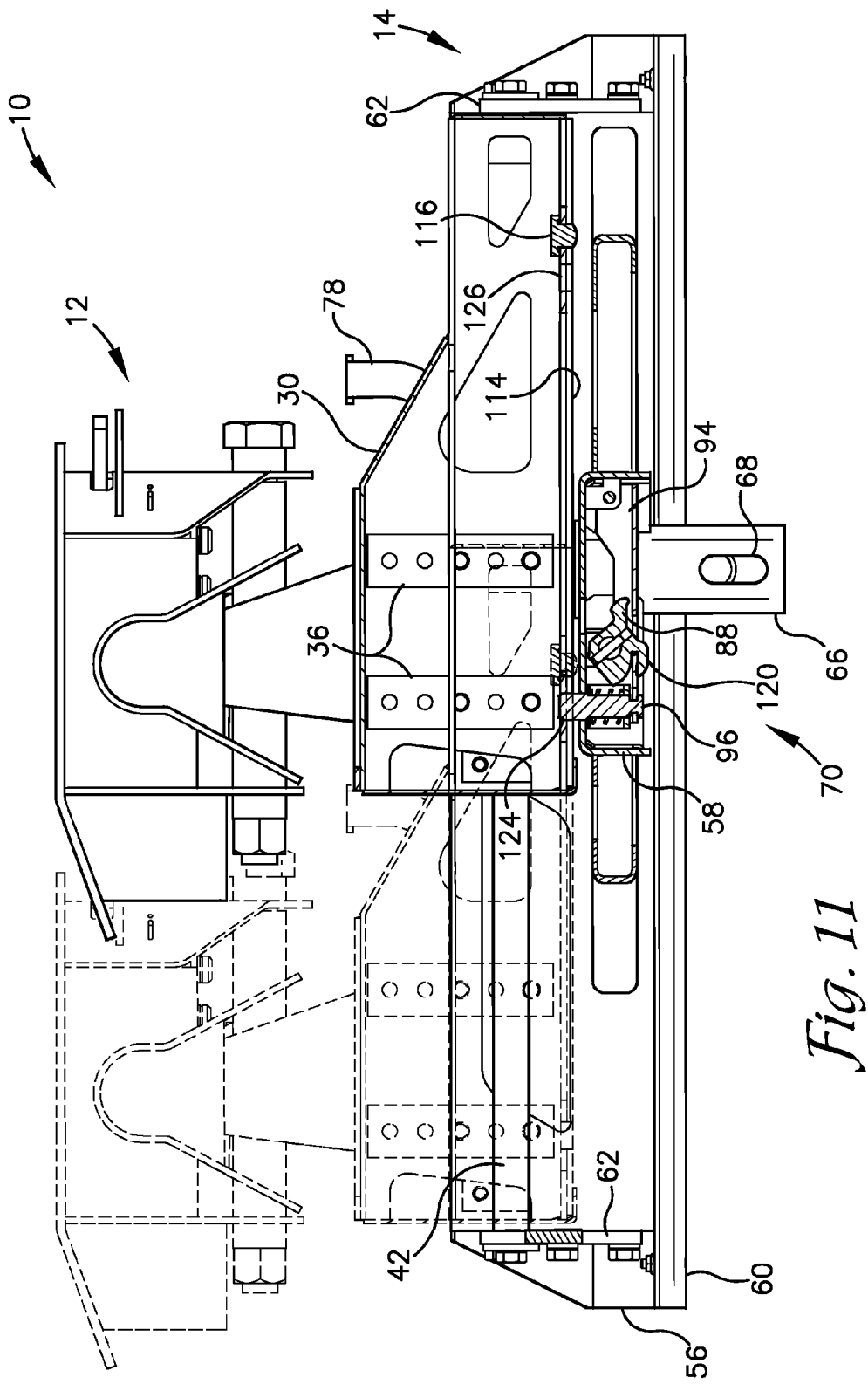
FIG. 11 is a cross-sectional side elevation along the line 8C-8C shown in FIG. 6 depicting the hitch carriage in a forward position in solid lines and a rearward position in phantom lines.

With reference now to FIGS. 8-11, operation of the sliding-hitch assembly 10 is described in accordance with an embodiment of the invention. As depicted in FIG. 11, the sliding-hitch assembly 10 is slideably and/or rollably moveable along the guide rails 42 from a forward position (depicted by solid lines) to a rearward position (depicted in phantom) to enable additional clearance between a trailer and a cab of a tow vehicle, among other advantages.

As depicted in FIGS. 8A-C and 11, in the forward position, the latching assembly 70 is initially in the locked orientation. In the locked orientation, the shaft 72 and the latch release and arming members 88 are rotated to position the arm 112 within the cross-member 58. The cam 117 is rotationally oriented to enable the pivoting plate 94 to pivot about the hinge 92 upward toward the cross-member 58. The coil spring 104 on the latch pin 96 biases the latch pin 96 upward through the top portion 65 of the cross-member 58 and thus draws the pivoting plate 94 upward toward the cross-member 58. The locking member 120 is extended through the aperture 122 in the pivoting plate 94 and to a position that is below a portion of the pivoting plate 94 to prevent downward movement of the pivoting plate 94 and thus the latch pin 96.

In the locked orientation, the latch pin 96 extends from the top portion 65 of the cross-member 58 and into the aperture or receiver 124 in the bottom surface 114 of the main support member 30 of the hitch carriage 16. As such, the latch pin 96 prevents rolling or sliding movement of the hitch carriage 16 along the guide rails 42. Also, in the locked orientation, as depicted in FIG. 8B, the lever arm 82 on the second end 84 of the shaft 72 is positioned above the center position and biased by the spring 86 to rotate the shaft 72 toward the locked orientation and thereby to maintain the locked orientation.

To move the latching assembly 70 to the unlocked orientation, the handle 78 is operated by a user to rotate the shaft 72 and the latch release and arming members 88 toward the unlocked orientation. As the shaft 72 is rotated, the lever arm 82 moves past the center position and is then biased by the spring 86 in an opposite direction toward the unlocked orientation. The user may continue to move the handle 78 to rotate the latch release and arming members 88 toward the unlocked orientation or the spring 86 may complete the rotation.

Figure 9A:
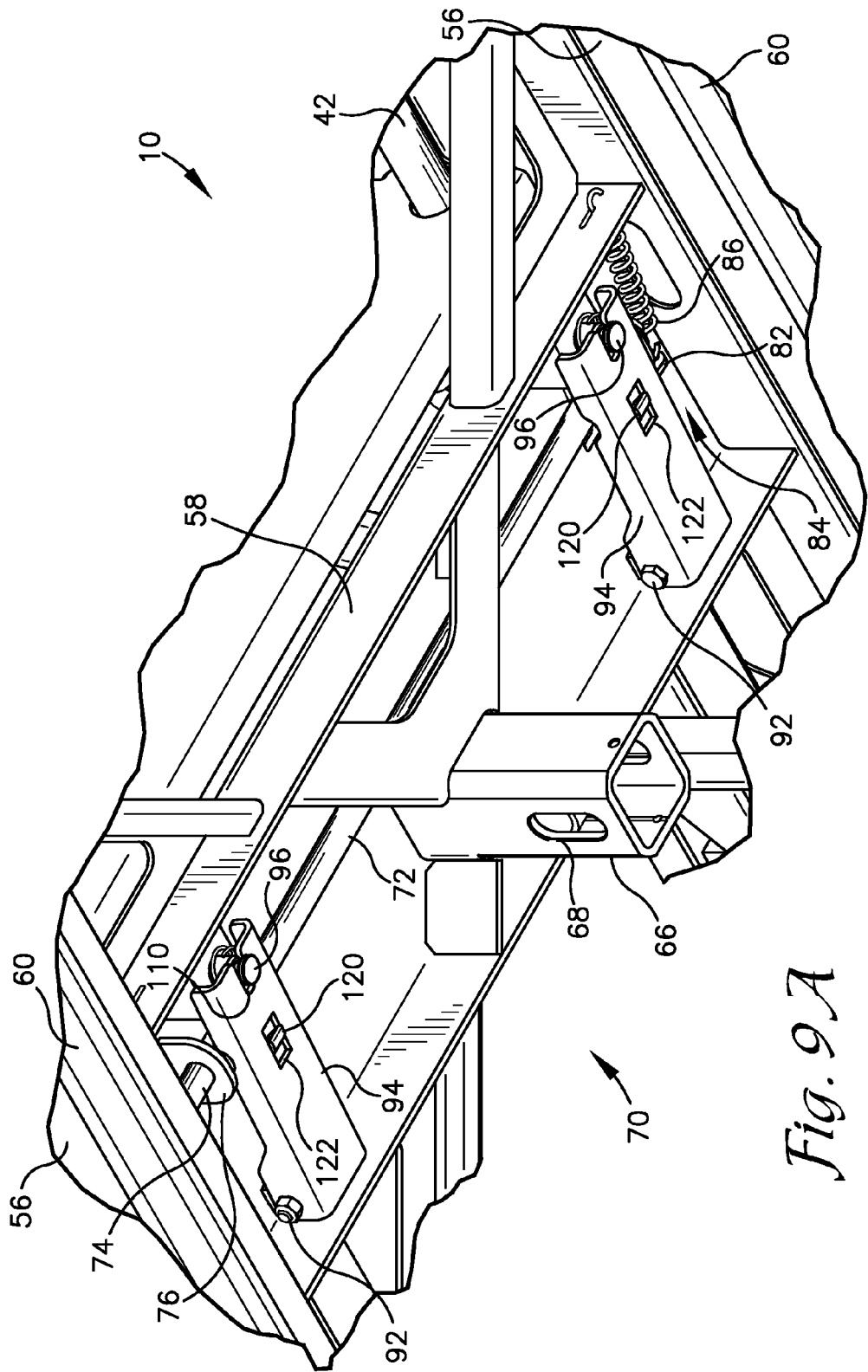
FIG. 9A is a bottom perspective view of the sliding fifth-wheel hitch assembly depicting the latching assembly in an unlocked orientation in accordance with an embodiment of the invention.
Figure 9B:
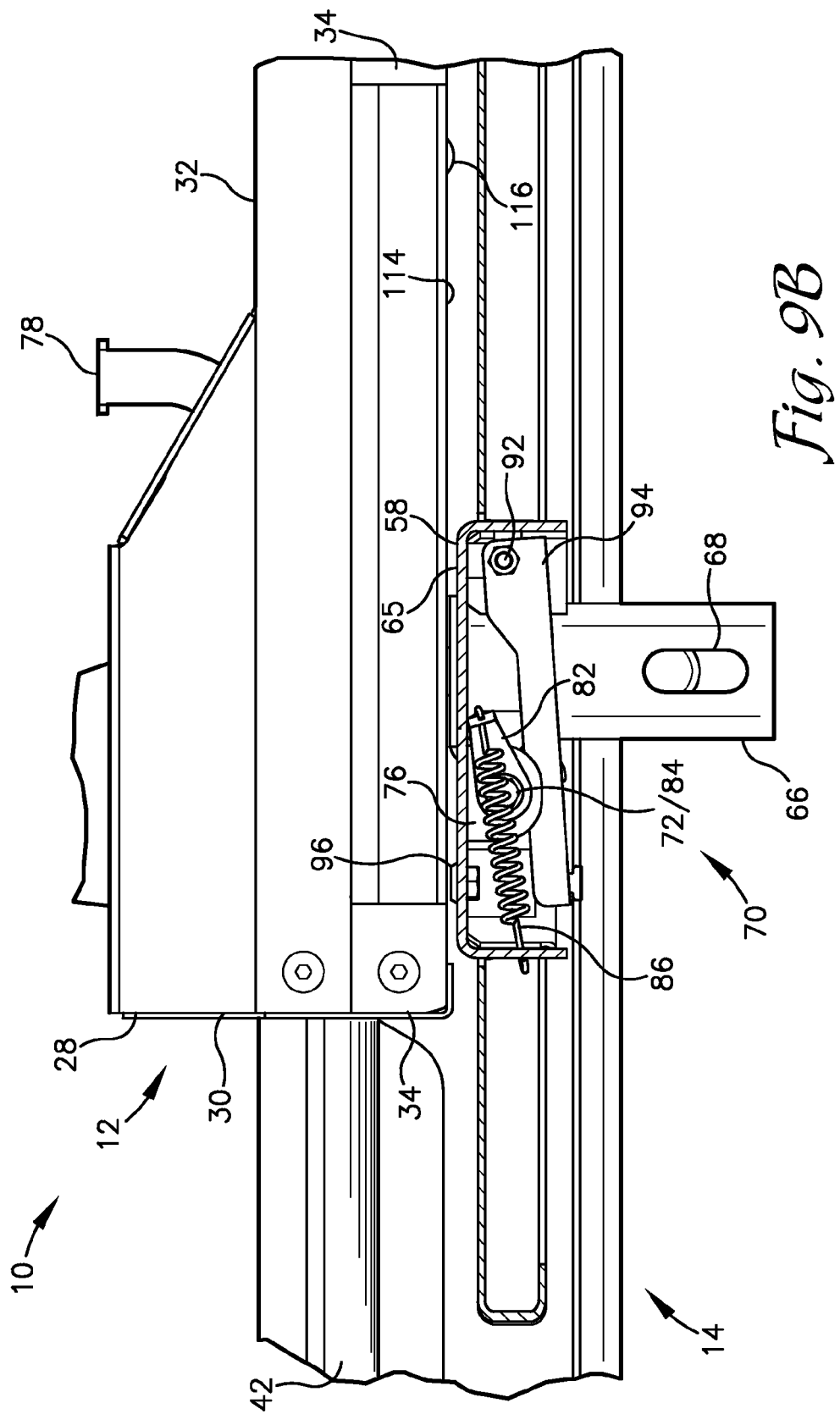
FIG. 9B is a cross-sectional elevational view taken along the line 9B-9B shown in FIG. 6 depicting the latching assembly in the unlocked orientation.
Figure 9C:
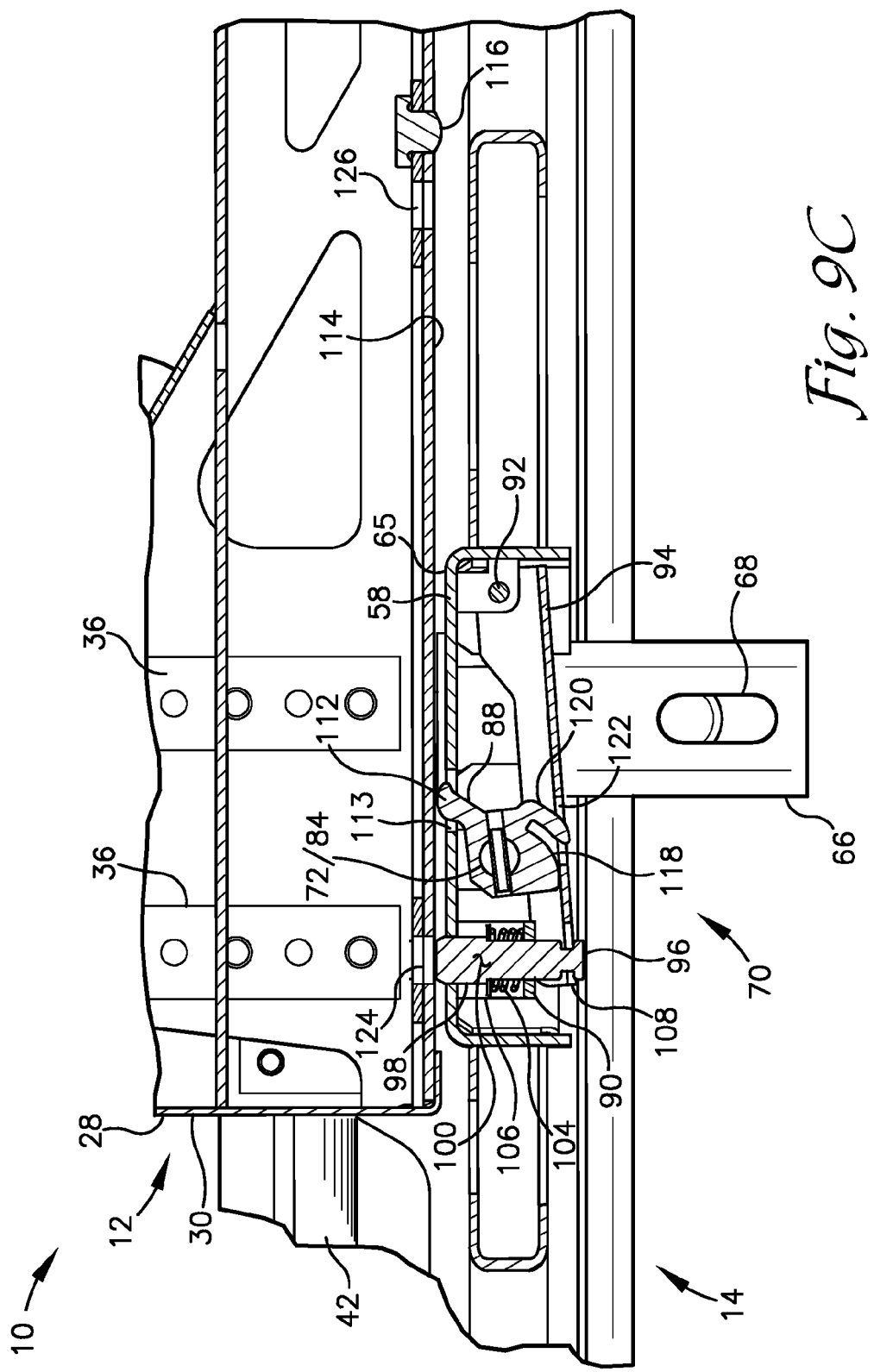
FIG. 9C is a cross-sectional elevational view taken along the line 9C-9C shown in FIG. 6 depicting the latching assembly in the unlocked orientation.
Figure 10C:
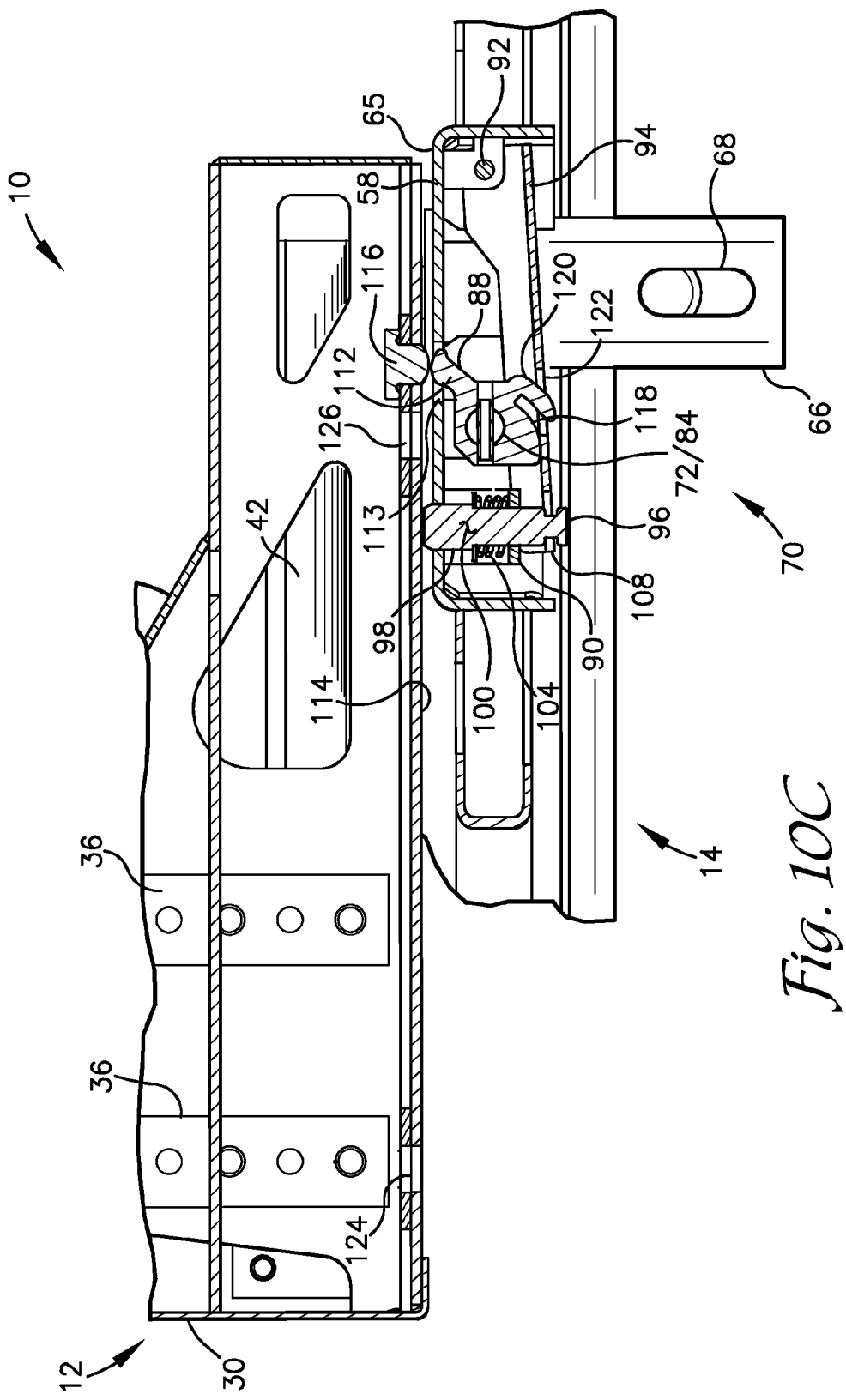
FIG. 10C is a cross-sectional elevational view similar to FIGS. 8C and 9C depicting the latching assembly in the armed orientation.

As depicted in FIGS. 9A-C, rotation of the shaft 72 rotates the cam surface 118 on the arming member 88 against the pivoting plate 94 to pivot the pivoting plate 94 downwardly about the hinge 92. Downward movement of the pivoting plate 94 withdraws the latch pin 96 from the receiver 124 in the bottom surface 114 of the main support member 30 and compresses the coil spring 104 between the washer 106 and the latch pin support plate 90. The distal end of the arm 112 of the arming member 88 is rotated upwardly to protrude from the top portion 65 of the cross-member 58 and into the path of the boss 116 on the bottom surface 114 of the main support member 30.

The hitch carriage 16 is thus free to slide or roll along the guide rails 42 from the forward position to the rearward position or vice-versa. The hitch carriage 16 might also be moved to one or more intermediate positions between the forward and rearward positions. As the hitch carriage 16 moves along the guide rails 42, the boss 116 contacts the distal end of the arm 112 protruding from the top portion 65 of the cross-member 58. The contact is sufficient to depress the arm 112 downwardly and to rotate the lever arm 82 past the center position, e.g. automatically arming the latching assembly to latch the hitch carriage 16 in position. As such, the spring 86 again biases the lever arm 82 toward the locked orientation thereby, rotating the cam surface 118 against the pivoting plate 94. The pivoting plate 94 is thus enabled to pivot upwardly to extend the latch pin 96 from the top portion 65 of the cross-member 58 via the bias provided by the coil spring 104. However, the latch pin 96 may not yet be aligned with a second receiver 126 associated with the rearward position, because, for example, the hitch carriage 16 may have not yet moved completely to the rearward position. As such, the latch pin 96 is biased into contact with the bottom surface 114 of the main support member 30 and slides therealong until achieving alignment with the second receiver 126 (or with the first receiver 124 again).

The pivoting plate 94 and the shaft 72 generally will not achieve full rotation toward the locked orientation until the latch pin 96 aligns with the first or second receiver 124, 126. The bias provided by the spring 86 on the lever arm 82 and by the coil spring 104 on the latch pin 96 maintains the latching assembly 70 in an intermediate state or armed orientation, biased toward the locked position.

Upon alignment of the latch pin 96 with the first or second receiver 124, 126, the latch pin 96 moves further upward and out of the cross-member 58 to engage the receiver 124, 126 and thereby prevent further sliding or rolling movement of the hitch carriage 16. And the spring bias continues upward pivoting of the pivoting plate 94 and continues the rotation of the shaft 72 to engage the locking member 120 with the pivoting plate 94. The handle 78 is also reset to an original position via its coupling to the shaft 72.

As shown, a single boss or protuberance 116 projects downward from the bottom surface 114 of each of the side support assemblies 28. Each of the bosses 116 is positioned in closely space relation in front of the second receiver 126 a distance less than the spacing between the latch pin 96 and the aperture 113 in the top of cross member 58. When the carriage 16 is slid rearward after advancing the latch release and arming members 88 to the unlatched position, withdrawing latch pins 96 from first receivers 124, the bosses 116 engage the arms 112 of the arming members 88 just before the second receivers 126 are brought into alignment with the latch pins 96 such that the arming members 88 are rotated to the armed orientation just prior to alignment of receivers 126 with latch pins 96. When the carriage 16 is latched in the rearward position (as shown in phantom lines in FIG. 11), the bosses 116 are positioned in closely spaced relation behind apertures 113 in the top of cross member 58. Upon advancing the latch release and arming members 88 to the unlatched position, the end of each arm 112 extends through respective aperture 113 and just in front of the associated boss 116. When the carriage 16 is then slid forward, the bosses 116 almost immediately engage arms 112 of the arming members 88 such that the arming members 88 are rotated to the armed orientation prior to subsequent alignment of receivers 124 with latch pins 96. It is foreseen that multiple bosses 116 could be included on and project downward from each of the side support assemblies 28.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A sliding-hitch assembly comprising:
    a base assembly configured to couple to a vehicle;
    a hitch carriage slideably coupled to the base assembly and moveable along the base assembly between a forward and an aft position, the hitch carriage including a hitch for coupling to a trailer; and
    a latching assembly disposed in the base assembly, the latching assembly including a latching member, an arming member, and a locking member, the latching assembly advanceable between a locked orientation, an unlocked orientation and an armed orientation;
    in the locked orientation, the latching member is biased to extend from the base assembly and toward the hitch carriage to engage one of at least a first and second receiver in the hitch carriage to prevent sliding movement of the hitch carriage with respect to the base assembly with the locking member preventing withdrawal of the latching member from the receiver,
    in the unlocked orientation, the latching member is withdrawn at least partially into the base assembly and is disengaged from the receiver in the hitch carriage and restrained from being biased toward the locked orientation, the arming member is positioned in the path of the hitch carriage such that contacting of the arming member by the hitch carriage during sliding movement of the hitch carriage along the base assembly, displaces the arming member and advances the latching member to the armed orientation,
    in the armed orientation, the latching member is biased toward the hitch carriage and then into the locked orientation when one of the at least first and second receivers is aligned therewith.

2. The sliding-hitch assembly of claim 1, wherein the arming member and the locking member are fixedly coupled to a shaft extending transverse to the base assembly, the shaft being rotatable about an axis extending along the length of the shaft.

3. The sliding-hitch assembly of claim 2, further comprising:
    a handle fixedly coupled to the shaft and enabling rotation of the shaft about the axis to move the latching assembly between the locked and unlocked orientations.

4. The sliding-hitch assembly of claim 2, further comprising:
    a lever arm extending radially outward from the shaft; and
    a spring coupled between a distal end of the lever arm and the base assembly, the lever arm and spring configured to provide an over-center condition in which the spring biases the lever arm to rotate the shaft toward the locked or unlocked orientation.

5. The sliding-hitch assembly of claim 2, wherein the latching assembly further comprises a pivot member that is pivotally coupled to the base assembly at a first end and to the latching member at a second opposite end, and wherein the arming member includes a cam surface and an arm that extends radially outward from the shaft, the cam surface configured to pivot the pivot member about the first end thereof to move the latching member to the unlocked orientation via rotation of the arming member about the axis.

6. The sliding-hitch assembly of claim 5, wherein rotation of the arming member to the unlocked orientation rotates a distal end of the arm in a first direction toward the hitch carriage and into a path of the protuberance.

7. The sliding-hitch assembly of claim 6, wherein contact between the protuberance and the distal end of the arm rotates the arming member and the shaft in a second direction a sufficient distance to enable a the arming member and shaft to be biased toward further rotation in the second direction and toward the locked orientation.

8. The sliding-hitch assembly of claim 2, wherein the latching assembly further comprises a pivot member that is pivotally coupled to the base assembly at a first end and to the latching member at a second opposite end, and wherein the locking member includes a finger extending radially outward from the shaft and configured to engage an aperture in the pivot member, the engagement of the finger with the pivot member restricting pivoting of the pivot member and withdrawal of the latching member from the receiver when in the locking orientation.

9. The sliding-hitch assembly of claim 1, wherein the latching member extends through a support bracket and a cross member of the base assembly and includes a spring disposed between the support bracket and a lever arm on the latching member, the spring biasing the latching member toward extension from the cross member and toward the hitch carriage.

10. The sliding-hitch assembly of claim 9, wherein the lever arm on the latching member comprises a shoulder on the latching member.

11. The sliding-hitch assembly of claim 10, wherein a washer is disposed abutting the shoulder and between the shoulder and the spring.

12. The sliding-hitch assembly of claim 1, wherein the base assembly is configured to removeably couple to the vehicle via a single point of attachment.

13. The sliding-hitch assembly of claim 1, wherein the hitch carriage is coupled to the base assembly using one or more of guide bars, rollers, glide blocks, and sliding surfaces.

* * * * *